Oct. 10, 1961 S. H. KAPLAN 3,003,874

OPTICAL CORRECTION IN MANUFACTURE OF COLOR IMAGE REPRODUCERS

Filed Oct. 26, 1956 7 Sheets-Sheet 1

INVENTOR.
Sam H. Kaplan
BY John J. Pederson
Attorney

OPTICAL CORRECTION IN MANUFACTURE OF COLOR IMAGE REPRODUCERS

Filed Oct. 26, 1956 7 Sheets-Sheet 2

INVENTOR.
Sam H. Kaplan
BY John J. Pederson
Attorney

INVENTOR.
Sam H. Kaplan
BY John J. Pederson
Attorney

Oct. 10, 1961 S. H. KAPLAN 3,003,874

OPTICAL CORRECTION IN MANUFACTURE OF COLOR IMAGE REPRODUCERS

Filed Oct. 26, 1956 7 Sheets-Sheet 4

INVENTOR.
Sam H. Kaplan
BY John J. Pederson
Attorney

Oct. 10, 1961 S. H. KAPLAN 3,003,874

OPTICAL CORRECTION IN MANUFACTURE OF COLOR IMAGE REPRODUCERS

Filed Oct. 26, 1956 7 Sheets-Sheet 5

INVENTOR.

Sam H. Kaplan

BY John J. Pederson

Attorney

Oct. 10, 1961 S. H. KAPLAN 3,003,874

OPTICAL CORRECTION IN MANUFACTURE OF COLOR IMAGE REPRODUCERS

Filed Oct. 26, 1956 7 Sheets-Sheet 6

INVENTOR.

Sam H. Kaplan

BY John J. Pederson

Attorney

Oct. 10, 1961 S. H. KAPLAN 3,003,874

OPTICAL CORRECTION IN MANUFACTURE OF COLOR IMAGE REPRODUCERS

Filed Oct. 26, 1956 7 Sheets-Sheet 7

INVENTOR.

Sam H. Kaplan

BY John J. Pederson

Attorney

United States Patent Office 3,003,874

Patented Oct. 10, 1961

3,003,874

OPTICAL CORRECTION IN MANUFACTURE OF COLOR IMAGE REPRODUCERS

Sam H. Kaplan, Chicago, Ill., assignor to Zenith Radio Corporation, a corporation of Delaware Filed Oct. 26, 1956, Ser. No. 618,590
6 Claims. (Cl. 96—35)

This invention relates generally to image reproducers of the type suitable for use in color television reproduction and more specifically to a new and improved process of fabrication of such tubes.

In the past there have been suggested various types of image reproducers suitable for use in color television receivers for the reproduction of high fidelity images in a plurality of their natural component colors. One of the more popular types of such image reproducers is one which is provided with a luminescent screen made up of a multiplicity of phosphor areas of sub-elemental dimensions arranged in geometrically similar interspersed groups. Each of the different phosphors possesses a different color-response characteristic and is capable of emitting light of a different one of the component image colors when excited by an electron beam. Such a tube is provided with an apertured color-selection electrode such as a parallax mask mounted between the screen and a plurality of electron guns. These guns are normally physically arranged with respect to one another so that they individually direct a beam of electrons through common apertures of the masking electrode from different angles so that predetermined ones of the sub-elemental phosphor areas may be selectively excited.

Another type tube of the same general character utilizes a single electron gun mounted along the central axis of the tube. The single electron beam which is produced by the gun is subjected to a particular type of deflection field in a well known manner by means of which it is rotated about the central tube axis. Thus, the apertured color-selection electrode and the luminescent screen may be approached from different angles by a plurality of electron-beam components derived from a single electron beam.

Still another type of color image reproducer utilizes a single electron gun mounted along the central axis of the tube and a luminescent screen made up of a multiplicity of different colored-light emitting phosphor strips of sub-elemental width disposed in interspersed groups and extending the full length of the screen. Such a tube is provided with a color-selection electrode composed of a multiplicity of small size conductors in the form of a wire grille disposed in the electron path closely adjacent and in parallel alignment with certain ones of the phosphor strips. By the application of well known volt-switching techniques, the color-selection electrode deflects the single electron beam to provide the desired instantaneous color response.

The expression "electron-beam components" as used in this specification is intended to cover the type of phosphor-exciting electronic energy produced by a single gun or a plurality of electron guns. This energy may be continuous or pulsating as required without departing from the scope of this invention.

In the first-order approximation theory of operation of such types of tricolor image-reproducing tubes, it is assumed that the electrons in the three electron beam components move in straight lines during and after deflection, and appear to have originated at three fixed points radially spaced in a plane perpendicular to the longitudinal central axis of the tube known as the plane-of-color-centers. Thus, in prior fabrication of such tricolor phosphor-dot or phosphor strip type fluorescent screens for example, appropriate light-emitting phosphors, such as silver-activated zinc sulfide for blue, manganese-activated zinc orthosilicate or willemite for green, and manganese-activated zinc phosphate for red, are deposited in the desired patterns on the internal concave surface of the faceplate by a well-known photographic exposure process. In such a process, the faceplate is usually utilized as the substrate for deposition of the screen and is first rendered photosensitive either by being provided with a uniform coating of a suitable positive or negative transformation coefficient photo-resist or a uniform thin paste or slurry coating containing one of the above-mentioned phosphors and a suitable photo-resist. Selective areas of the coated substrate are then exposed to a suitable source of light, preferably actinic light rays, as projected through the openings or apertures of a color-selection or masking electrode. The light source is preferably a fixed-position high pressure capillary mercury-arc lamp which projects the light rays through an optical condensing element the optical position of which corresponds to one of the color-centers of the finished tube and which constitutes essentially a small source of light. The selected areas of the coated substrate are exposed to the light rays for a time sufficient to transform correspondingly selective areas of the photo-resist to a modified condition. In a process in which the substrate is first coated with only a photo-resist, instead of the photosensitive phosphor slurry, the phosphor is slurried or settled onto selective areas of the coated substrate corresponding to the exposed portions of photo-resist in a well known manner. Thereafter, the unexposed areas of the substrate coating are washed away, or otherwise removed, and then the process is repeated for the other two remaining phosphors with the light source successively transferred to positions corresponding to the two remaining respective color-centers. A suitable process is specifically described and claimed in the copending application of Sam H. Kaplan et al., Serial No. 463,176, filed October 19, 1954, for "Method of Manufacturing Luminescent Screens," and assigned to the present assignee.

In the actual operation of such a completed tube, to obtain color purity, the yoke is preferably placed so that its plane-of-deflection is located coincident with the plane-of-color-centers. Assuming a three-gun array is used, the individual guns in the array are located so that the straight line paths of the electron beams therefrom intersect the plane-of-deflection at points corresponding to the respective optical positions of the light source during exposure of the screen. The plane-of-deflection can thus be defined as the plane in which the electron beams or beam components, as projected rearwardly from the screen, intersect the axes of origin of the electron beams or beam components.

The described fabrication procedure is accurate for relatively small deflection angles of the electron beams; however, the larger the deflection angle the less exact becomes the register between the phosphor dots and electron spots. The term "register" is employed to convey the concept of the accurate landing required of the electron-beam components on the appropriate phosphor dot; perfect register occurs when the center of each fluorescent spot of the electron-beam components coincides with the center of the corresponding phosphor dot. An ideal tricolor phosphor-dot cathode-ray tube can be defined as one in which the fluorescent screen is completely covered with tangent sub-elemental phosphor dots of the same uniform diameter and in which each electron-beam component has perfect "landing" with the resulting electron spots on the screen of the same uniform diameter as the phosphor dots. The ideal tube would then be capable of producing three separate color fields, each having perfect color purity and uniform brightness. If these three fields were produced simultaneously in the appropriate relative brightness, the result would be a uniform white field. This last consideration is extremely important since, in the present compatible system, color tubes must be capable of high quality black-and-white reproduction.

However, in actuality, contra the first-order approximation theory, the electron-beam components do not appear to have originated from the same fixed points at all times because the plane-of-deflection of the yoke does not remain in a fixed position during scanning of the fluorescent screen. In fact, it is well known that the center-of-deflection of the yoke moves toward the screen as the beam deflection angle is increased. This displacement occurs whether a modern deflection yoke having a flared "front end" and extensive fringe fields, or a hypothetically simplified yoke having "flat" fields and no fringes, is considered. Because of this displacement and the fact that each set of different color phosphor dots is exposed simultaneously from a stationary source of light, the paths of the electron-beam components are dissimilar from those of the exposure light rays. The resulting error is an undesirable radial misregister between the electron spots and the phosphor dots on the screen, giving color dilution or color purity contamination most predominant along the peripheral areas of the fluorescent screen.

Another source of misregistration encountered in the operation of such tubes is due to the well-known necessity of dynamic convergence correction. Approximate static convergence is usually obtained by first mechanically tilting each of the three guns, assuming a three-gun array, toward the tube axis and then by introducing electrostatic or electromagnetic static convergence correction fields, so that the electron-beam components converge on the tube axis at the plane of the aperture-mask or color-selection electrode. Thereafter, during scanning, the beams converge at a highly curved surface concave toward the deflection center. Because of the relative "flatness" of the aperture mask, at the larger deflection angles the beams converge before reaching the mask. Also because of fringe fields of the deflection yoke the three beams are deflected unequally during scanning. These undesirable conditions may be corrected by the application of dynamic convergence signals derived from, and in synchronism with, the horizontal and vertical scanning signals and applied to the windings of external convergence electromagnets all in a well known manner. The dynamic convergence fields developed during scanning shift the beams radially outwardly from the tube axis by an amount dependent upon the angle of deflection. Since the spacing between the beam spots at the screen is, for all practical purposes, a constant demagnification of the spacing between the beams in the plane-of-deflection, such an increase in radial spacing during scanning results in a separating or "degrouping" of the electron spots with respect to the phosphor dot triads, which is also highly undesirable and tends to cause an additional objectionable deterioration of color purity which again is most predominant at the peripheral areas of the screen.

Several methods have been suggested in the past for the correction of radial misregister; one of these involves the reduction of the diameters of the apertures of the mask which increases the tolerance with respect to radial misregister at the expense of some loss in brightness. Another method of correction which has been suggested involves a greater-than-usual displacement of the yoke from the mask. In that case, the plane-of-deflection starts in back of the plane-of-color-centers and, in traveling forward as a function of deflection angle, passes ahead of the plane-of-color-centers but not by an amount as great as with the yoke in the conventional position. The misregister is thus negative for small deflection angles and positive for large deflection angles. When the yoke position is thus comprised to improve radial misregister, there is less freedom of additional adjustment of the yoke position to correct for other deviations such as statistical tube variations. A third and most desirable suggestion for the correction of such radial misregister involves the use of a correcting refractive optical field by interposing a lens between the light source and the color-selection electrode during exposure of the fluorescent screen. The lens has the property that the virtual source of light, as seen from the color-selection electrode, moves forward as a function of deflection angle in the same way as does the plane-of-deflection of the yoke in subsequent tube operation. The beams of light after passage through the lens thus essentially coincide with the actual paths of the electron-beam components and phosphor dots are then placed on the face plate exactly where the electron-beam components strike.

While the suggestion of optical correction for radial misregister has met with acceptable success, there has yet to be devised an acceptable solution for the equally important correction of degrouping misregister of the electron beam spots due to dynamic-convergence correction. To date, the only practical solution to the problem, again in the form of a compromise, is by adjusting the convergence correction so that the electron-beam components converge correctly in the plane of the color-selection electrode only at points approximately midway between zero and maximum beam deflection angles. With this type of compromise, a degrouping misregister, although reduced in magnitude, remains, being negative for small deflection angles and positive for large deflection angles.

Therefore one of the principal objects of this invention is to devise a new and improved screen fabrication process for color image reproducers which alleviates the necessity of a compromise for degrouping misregister.

Another equally important object of this invention is to devise a new and improved screen fabrication process for color image reproducers which simultaneously corrects for both radial and degrouping misregister.

Still another object of this invention is to devise a new and improved screen fabrication process for color image reproducers of the type which are adaptable to both the sequential and the simultaneous types of image reproduction and which simultaneously corrects for both radial and degrouping misregister of such tubes.

A further corollary object of this invention is to devise a new and improved screen fabrication process for color image reproducers which simultaneously corrects for both radial and degrouping misregister in a simple, economical, yet highly effective manner and is capable of being carried out by an unskilled operator in a minimum of time and with a minimum exercise of physical dexterity.

The present invention provides an improvement in the art of manufacturing a cathode-ray tube of the type which requires dynamic convergence correction and contains a color-selection electrode having a multiplicity of systematically arranged apertures through which a plurality of electron-beam components pass along different angularly related paths, in transit from respective color-centers located at respective predetermined points which are radially spaced from the longitudinal axis of the tube and located in a plane-of-deflection substantially perpendicular to the tube axis, to impinge upon respective sub-elemental areas of respectively different color-response characteristics on the mosaic surface of a nearby fluorescent screen. Specifically, the invention provides a process of producing a fluorescent screen comprising such sub-elemental areas arranged on a support in a selectively distorted pattern to compensate for an effective lateral shifting of position of the plane-of-deflection relative to the color-selection electrode. The shift lateral varies in amount with deflection of the electron-beam components and is of a maximum amount $\Delta C$. The pattern serves, additionally, to simultaneously compensate for a radial shifting of position of the color-centers relative to the tube axis. The radial shift varies in amount with dynamic convergence, being of a maximum amount $\Delta A$ so that each of the electron-beam components centrally impinge upon their respective sub-elemental areas over substantially the entire area of the fluorescent screen. The process of the invention comprises the steps of first providing the support with a coating of material sensitive to light energy. Light energy is then projected from a selected point corresponding to one of the aforesaid predetermined points along a reference axis extending toward the color-selection electrode. The projected light energy is then passed through a refractive lens at a location with its effective optical center in the aforesaid reference axis and of a configuration compensating for the plane-of-deflection effective position shift and canted about the effective optical center in a positive direction with respect to the reference axis by an angle whose tangent is approximately $$\frac{\Delta A}{\Delta C}$$

to compensate for the color center effective position change and redirect the light energy along corrected paths through the apertures of the color-selection electrode to expose selective areas of the coating to the light energy.

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

Figure 10:
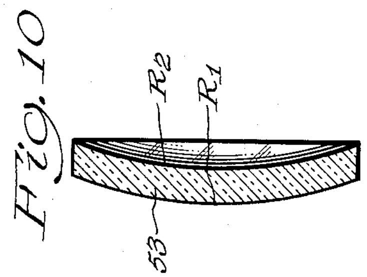
Figure 9:
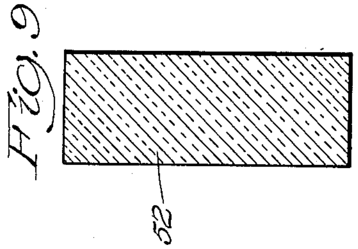
Figure 8:
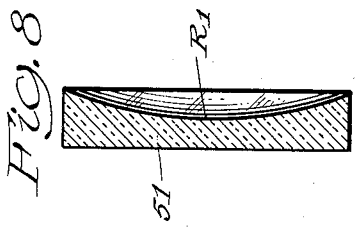
Figure 7:
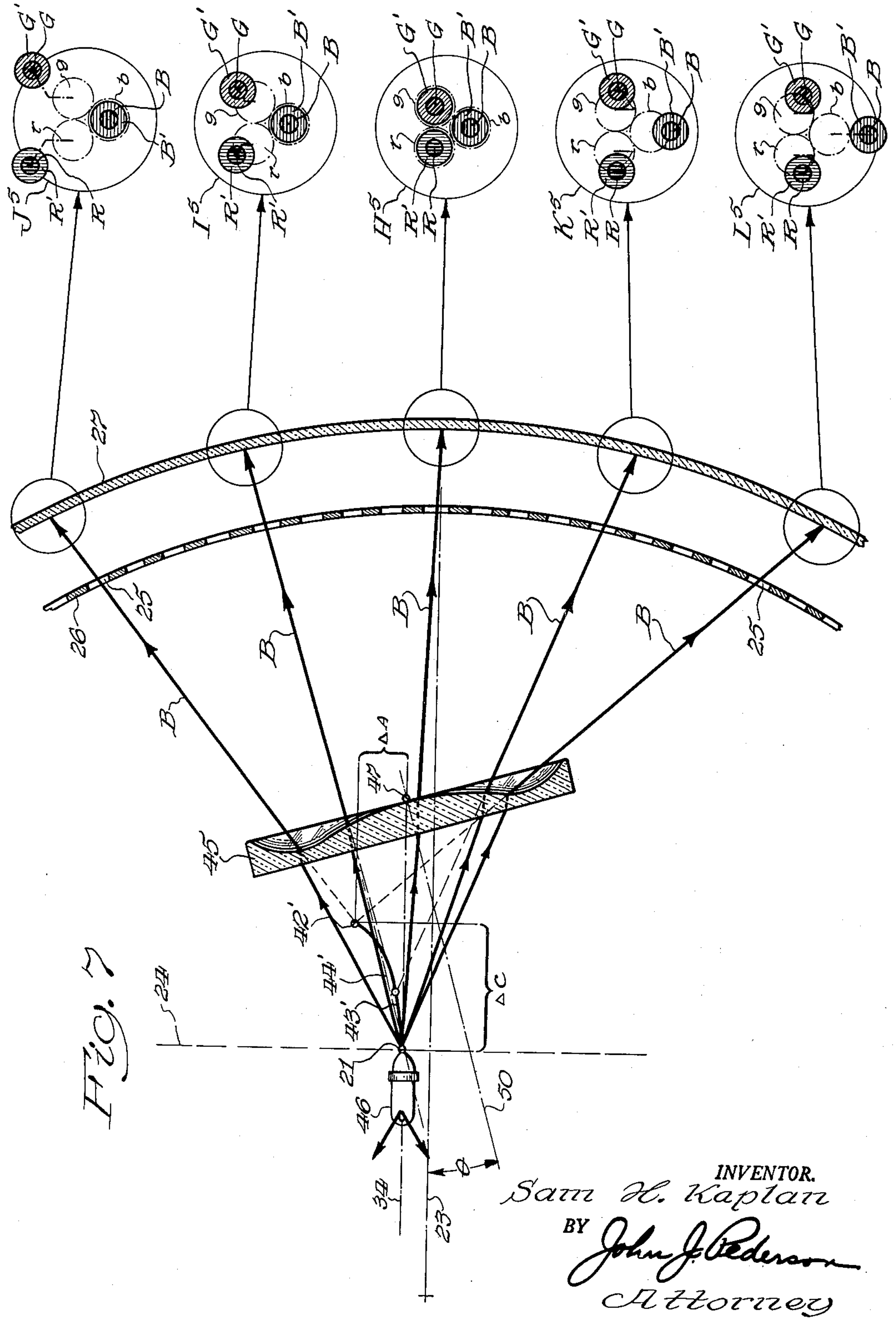

FIGURE 7 is a diagrammatic representation, partly in section, depicting exposure geometry utilizing a selectively distorted refractive optical correcting field in accordance with another embodiment of the present invention; and FIGURES 8–10 are cross-sectional views of various other refractive optical correcting field producing elements which may be utilized in performing the process of the present invention.

Figure 1:
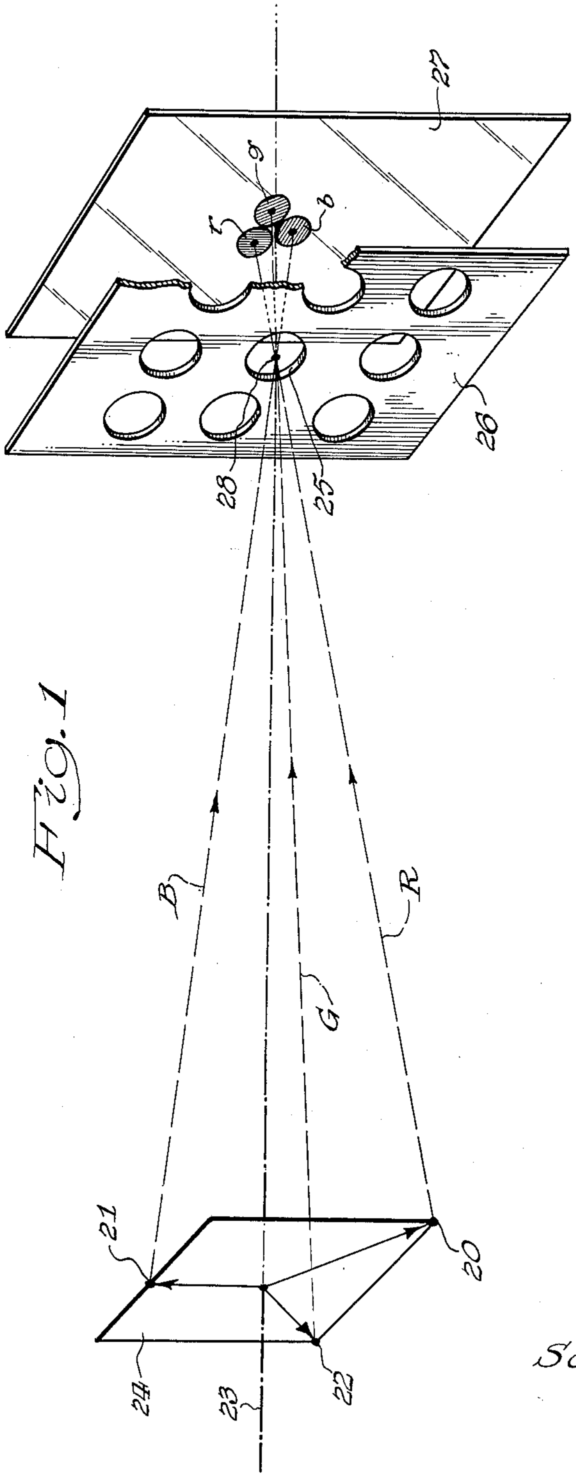
FIGURE 1 is a diagrammatic representation depicting the geometry of a planar-mask system.

Before the invention can be fully appreciated, the problem which is to be solved must be completely understood. For this purpose, reference is made to FIGURE 1 of the drawings which shows the geometrical relationship between the electron-beam components of a tricolor three-gun shadow-mask image reproducer. It is to be understood of course that the angular disposition of the electron-beam components relative to one another and to the central longitudinal axis of the cathode-ray tube, as well as the relative spacing between and the dimensions of the various components, are greatly exaggerated in all of the drawings so that the critical relationships between the electron-beam components, color-selection electrode, fluorescent screen, and other essential components may be clearly shown. And, again, for ease of reference in the following portions of this description, the lines representing the path projections of the electron-beam components will be referred to as the electron beams themselves.

In this figure the three electron beams designated R (red), B (blue), and G (green) appear to have their origin at color-centers 20, 21 and 22, respectively, which are at equal radial distances from central longitudinal axis 23 of the cathode-ray tube and are equi-angularly spaced within a plane coincident with yoke plane-of-deflection 24 which is substantially perpendicular to central tube axis 23. Electron beams R, B, and G are assumed in this instance to have straight line trajectories through common systematically arranged apertures 25 in a substantially flat shadow mask or color-selection electrode 26 and selectively impinge upon systematically arranged triads of respective sub-elemental areas of *r* (red), *b* (blue), and *g* (green) light emitting phosphors on the mosaic surface of a substantially flat fluorescent screen 27 in close proximity thereto; the planes of color-selection electrode 26 and fluorescent screen 27 are substantially parallel to plane-of-deflection 24 and are centrally disposed about central tube axis 23. As shown, electron beams R, B, and G intersect or converge at point 28 within the plane of color-selection electrode 26 and centrally impinge in perfect register with fluorescent dots *r*, *b*, and *g*, respectively, to give perfect color rendition.

Figure 2:
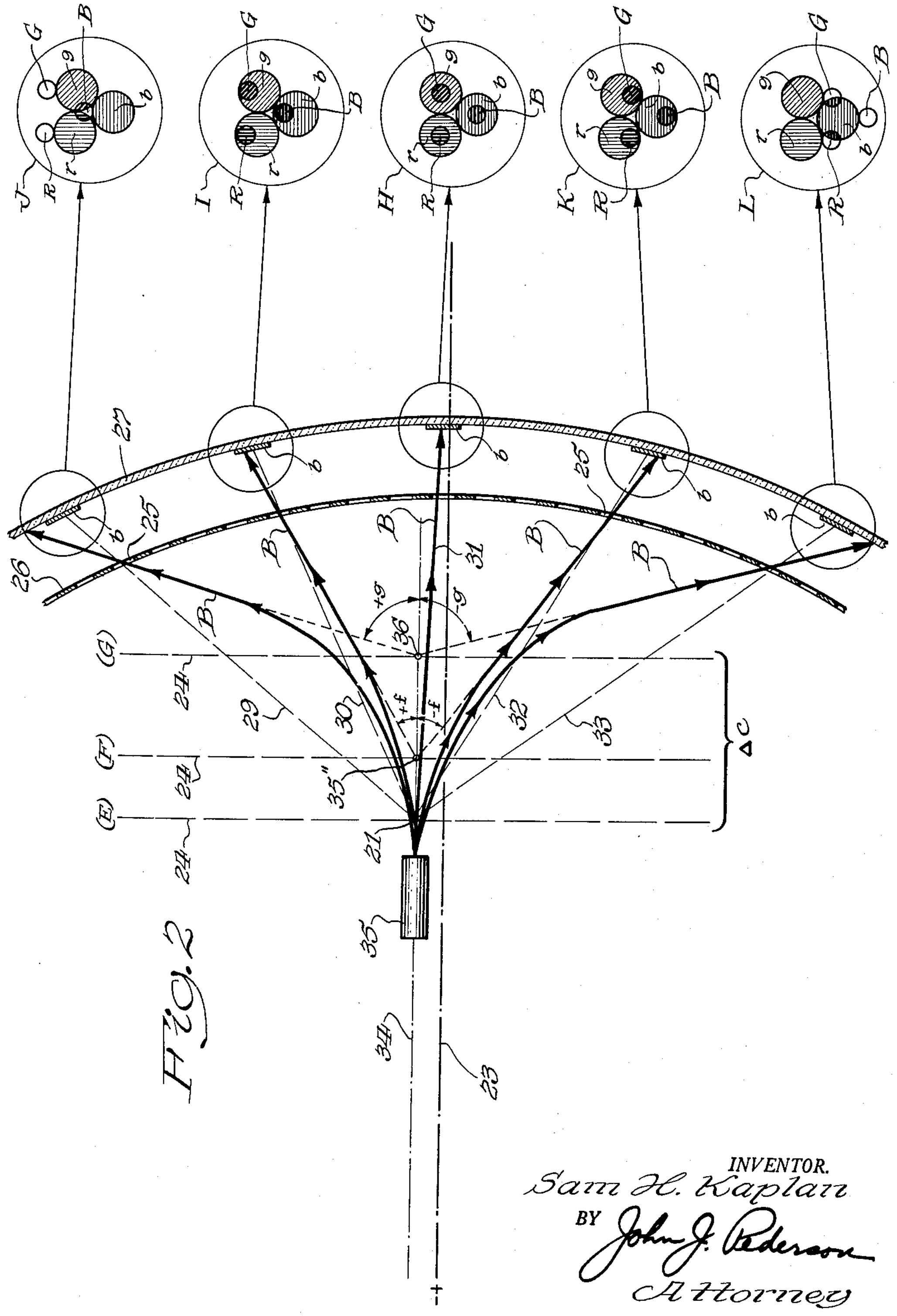
FIGURE 2 is a diagrammatic representation exemplifying radial misregister due to a shifting of position of plane-of-deflection with variation in beam deflection angle.

With reference to FIGURE 2 of the drawings, there is shown the geometry illustrating the shifting-of-position of the effective plane-of-deflection with the angle-of-deflection of the electron beams. For the purpose of simplicity, only the geometric relationship between one electron beam B and its respective set of phosphor dots *b* is shown for it is apparent that, due to the symmetrical relationship between the electron beams and phosphor dots, the same geometric relationship exists between the remaining electron beams R and G and their respective sets of phosphor dots *r* and *g*. It is to be also pointed out that the representations in this figure and the ones following are in effect projections of the paths of the electron beams into a vertical plane so as to enhance a more clear understanding of the description. In the example it has been assumed that phosphor dots *b* have been simultaneously deposited on fluorescent screen 27 by prior well known photographic exposure techniques whereby the fluorescent material is deposited at those spots where exposure light beams 29, 30, 31, 32 and 33, emanating from a common source positioned at blue color center 21 and projected symmetrically with respect to an optical axis 34 parallel to tube axis 23, strike the internal faceplate of the cathode-ray tube after having passed through apertures 25 of color-selection electrode 26. It is also assumed that in subsequent operation of the tube, the electrostatic or electromagnetic beam deflection device is positioned so that its plane-of-deflection, shown as a dashed line 24, coincides with color center 21 as shown at position E for zero beam deflection angle.

Thus, in operation, an electron gun 35 is centered about optical axis 34 so that electron beams B emanating therefrom intersect plane-of-deflection 24 at color center 21. Electron beam B, at small deflection angles, is projected along a path coincident with the path previously occupied by exposure light beam 31 and therefore is in perfect register with phosphor dot *b* at the center of screen 27, as shown in the enlarged plan view H. In this view, the diameters of electron beam spots R, B, and G are indicated as being much smaller than the diameters of the respective phosphor dots *r*, *b*, and *g*. It is to be understood of course that for maximum brightness output, the diameters of the electron beams and of the phosphor dots should be equal.

During scanning of the tube raster, it is well known that the electron beam travels through the yoke field along a curved path. After leaving the field, the beam travels in a straight line tangent to its previous curved path at the point of exit. When the strength of the yoke field is increased to obtain greater deflection, the radius of the curved path is decreased, and the beam remains longer within the yoke field. If the resulting exit tangents are extended back to the tube axis, it can be seen that the effective center-of-deflection of the yoke moves forward with each increase in electron beam deflection angle. Therefore, it can now be appreciated that as electron beam B is deflected upward to the center of the upper half of screen 27, as viewed, by a positive angle $+f$, the path of the electron beam no longer coincides with that originally occupied by exposure light ray 30 so that electron beam B is not in register with phosphor dot $b$, as shown in the enlarged plan view I. Instead, electron beam B is shifted upwardly with respect to phosphor dot $b$, giving rise to a radial misregistration error. Electron beam B, at this point, appears to have originated at a point source located at 35″, the intersection of the tangent of the curved path at the point of exit from the yoke field with optical axis 34, instead of the original color center 21. It is seen therefore that the effective plane-of-deflection has now shifted from position E to position F. As also illustrated in exploded view I, the center of the electron spot triad also shifts upwardly with respect to the center of the phosphor dot triad or radially outwardly with respect to the center of screen 27, so that the radial misregistration is identical for all electron beams R, B, and G with respect to the respective phosphor dots $r$, $b$, and $g$.

As electron beam B is deflected upwardly by a greater positive deflection angle of $+g$, the beam completely misses phosphor dot $b$ as shown in enlarged plan view J and appears to have originated at a point source located at 36; thus the effective plane-of-deflection is shifted from position F to position G. As electron beam B is deflected downwardly to the center of the lower half of screen 27 by an amount indicated by negative angles $-f$ and $-g$ respectively, the radial misregistration error is now radially downward with respect to the center of screen 27 and is in the opposite direction than before, as shown in views K and L. However, even with a negative deflection angle as shown, electron beam B still appears to have originated at successive points 35″ and 36 as before and again the effective plane-of-deflection shifts successively from position E to positions F and G with an increase of deflection angle exactly as before. Therefore, the maximum radial misregistration error can be measured in terms of the maximum axial shift ΔC of the effective plane-of-deflection from E, at zero beam deflection angle, to G, at maximum beam deflection angle.

Figure 3:
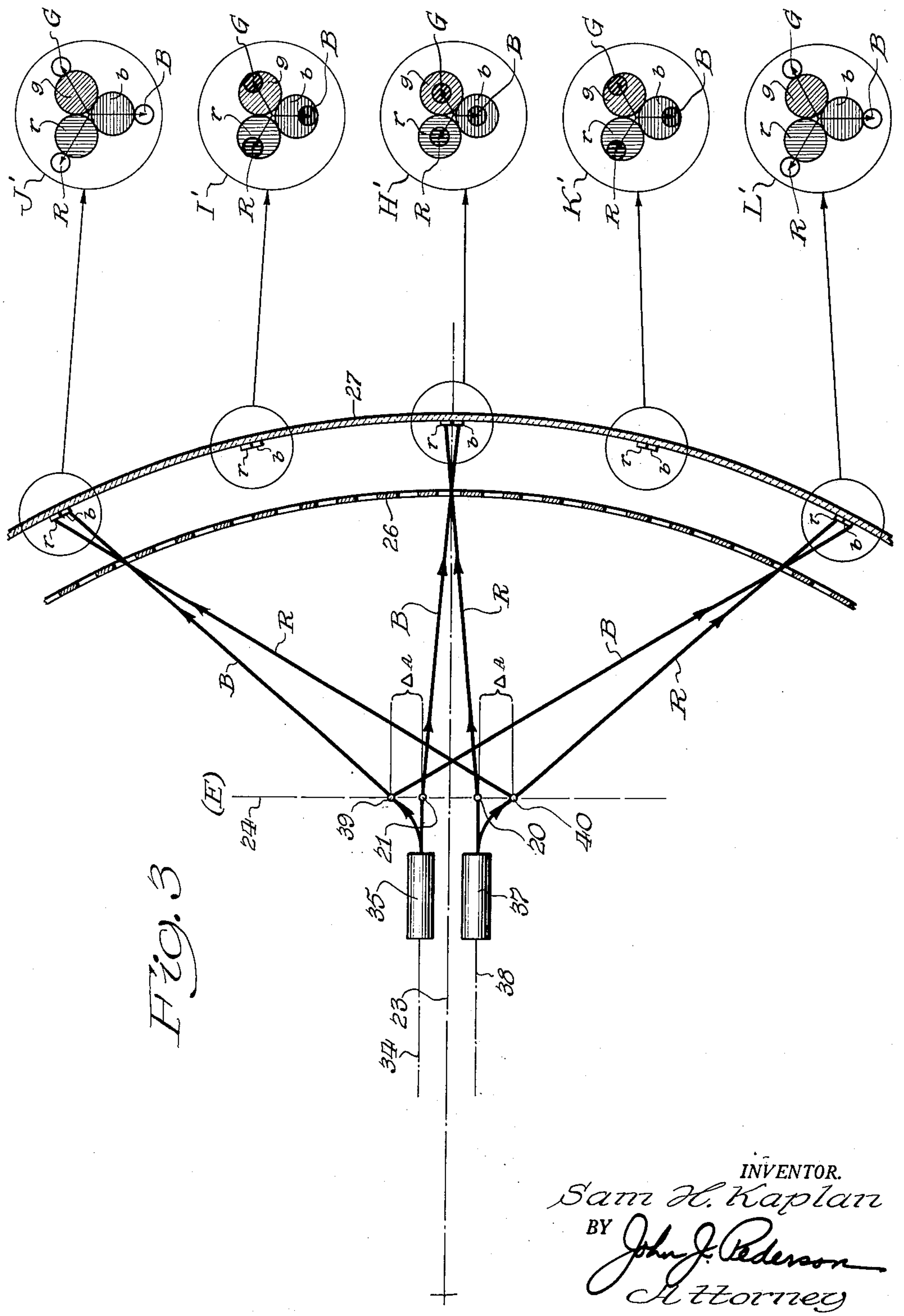
FIGURE 3 is a diagrammatic representation exemplifying degrouping misregister due to dynamic convergence correction.

As mentioned previously, dynamic convergence involves variation of the relative angles of the electron beams as they scan the screen in order to maintain convergence throughout the raster. With the use of conventional convergence means, normally located in the gun some distance back of the yoke, the radial separation between the beams increases as they pass through the plane-of-deflection simultaneously with an increase of strength of the dynamic convergence field. FIGURE 3 illustrates this phenomenon by showing for simplicity only two electron beams R and B in the plane of tube axis 23. Gun 37 is positioned in axial alignment with optical axis 38 which extends through color center 20 parallel with central tube axis 23. As previously stated, approximate static convergence is usually obtained by first mechanically tilting the individual axes of the three electron guns toward the tube axis and, optionally, by additional electrostatic or electromagnetic static convergence correction, so that the undeflected electron beams converge on the tube axis at the plane of the color-selection electrode. However, for the sake of simplification of the geometry involved, electron guns 35 and 37 are shown in axial alignment with optical axes 34 and 38, respectively, and it has been assumed that the undeflected electron beams R and B are caused to converge on tube axis 23 in the plane of color-selection electrode 26 by only the application of static convergence correction in a well known manner.

Even though it is not readily apparent by observation of FIGURE 3, whose scale has been intentionally exaggerated for clarity, in actuality the radius of curvature of color-selection electrode 26 and screen 27 is much larger than the sweep radius of the electron beams as measured from plane-of-deflection 24 to color-selection electrode 26 and screen 27 respectively. Thus the color-selection electrode and screen appear relatively flat and because of this relative flatness, the electron beams converge during normal scanning deflection, before reaching the plane of the color-selection electrode. As before noted, it is a well known practice to derive a dynamic convergence current from and in synchronism with the horizontal and vertical scanning waves and to apply this correction current to an electrostatic or electromagnetic dynamic convergence apparatus so that as screen 27 is scanned out to its edge, the apparent sources of electron beams B and R shift radially outwardly, with respect to tube axis 23, by an amount proportional to the dynamic convergence correction. Thus, for zero beam deflection angle, the color-center for beam B appears at point 21 and for maximum positive or negative beam deflection angle, appears to have moved to point 39; the total distance between points 21 and 39 may be represented by ΔA. For zero beam deflection angle, the color-center for beam R appears at point 20; however, for maximum beam deflection angle, either positive or negative, the color-center appears to have moved radially outward to point 40, and the total distance between points 20 and 40 is also equal to ΔA.

As shown in enlarged view H′, by proper application of static convergence correction, electron beams R, B, and G are in perfect register with the respective fluorescent dots $r$, $b$, and $g$ at the center of screen 27. When electron beams R and B are deflected upward, as viewed, from zero to maximum deflection, the center of the electron spot triad remains coincident with the center of the phosphor dot triad; however, as shown at I′, electron beam spots R, B, G diverge and thus cause a degrouping misregister or registration error. For a maximum positive deflection angle, the electron beams diverge even further, as shown in view J′, so that the electron beams may completely miss the intended phosphor dot targets thus giving rise to an undesirable color purity contamination most predominant along the peripheral areas of screen 27. As electron beams R and B are deflected downwardly in a negative direction from zero to maximum deflection, the electron spot triad again diverges in exactly the same manner as before. Therefore, it can be seen that with both positive and negative deflection angles of the electron beams, the degrouping misregister error is exactly the same in each direction, the maximum amount being measured in terms of a maximum radial shift of color centers 20 and 21 with respect to tube axis 23 represented by ΔA.

Figure 4:
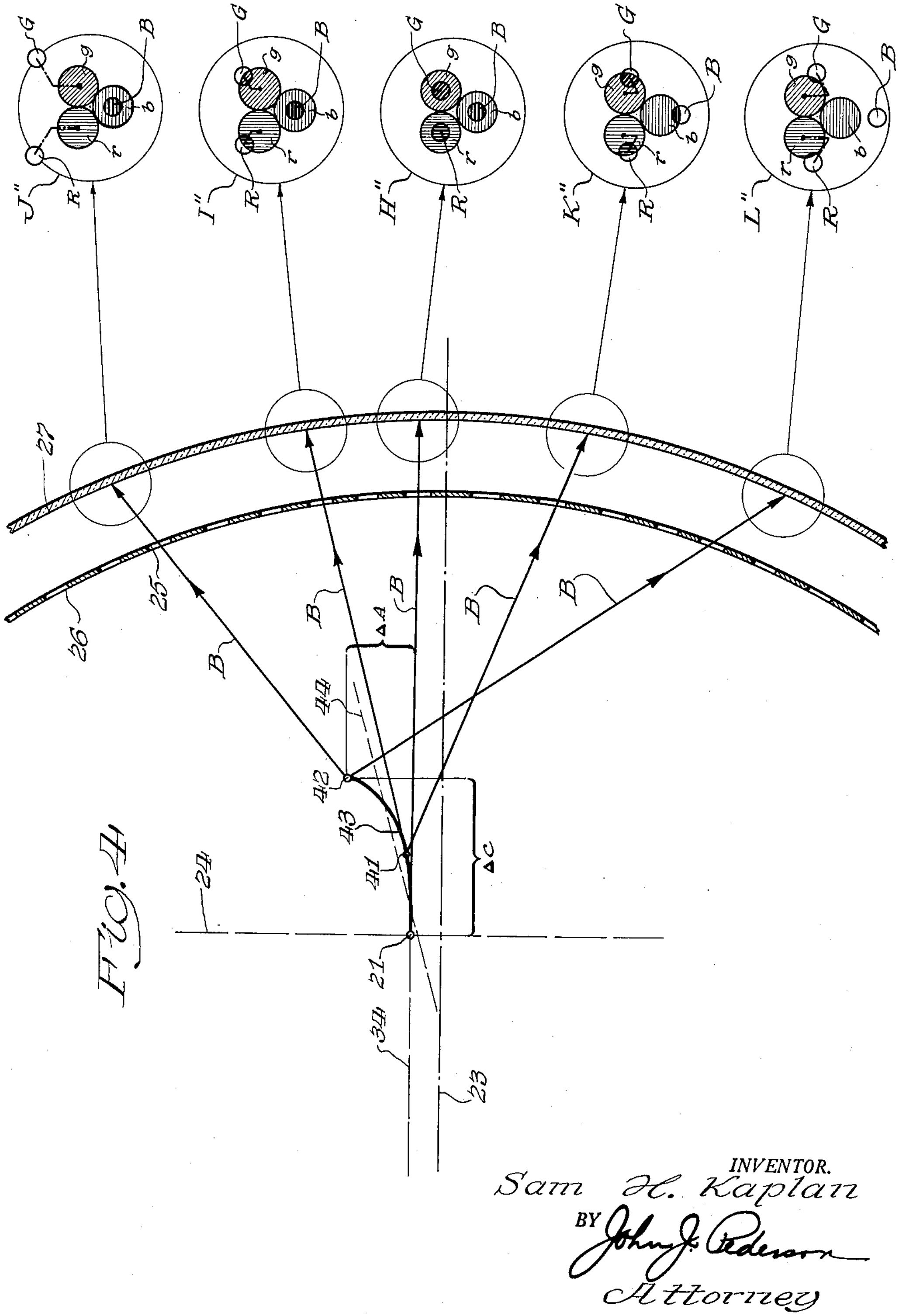
FIGURE 4 is a diagrammatic representation exemplifying the shifting of position of the apparent electron source due to both the dynamic convergence correction and shifting of position of the plane-of-deflection.

With reference to FIGURE 4 of the drawings, there is shown the relationship of the position or location of the color-centers with respect to the combined effect due to a shifting of the plane-of-deflection and dynamic convergence correction. Again, for simplicity, only the B (blue) beam geometry is considered. It is seen that the radial shift of the color-center position as represented by a maximum of ΔA is in quadrature with the axial shift of the color-center position as represented by a maximum of ΔC. Thus, for zero beam deflection angle, electron beam B appears to have originated at point 21. However, for an intermediate negative or positive beam deflection angle, electron beam B appears to have originated at point 41 and for a maximum negative or positive beam deflection angle, appears to have originated at point 42. Thus, a smooth curve, shown as 43, drawn through points 21, 41 and 42 represents the apparent locus of the color-center as the beam deflection angle increases from zero to a maximum, and a straight line 44 representing the average slope of curve 43 is inclined with respect to optical axis 34 by an angle whose tangent is slightly less than $$\frac{\Delta A}{\Delta C}$$

For zero beam deflection angles, as shown in view H″, electron beams R, B, and G impinge in perfect register on the respective phosphor dots *r*, *b*, and *g*. However, as the electron beams are deflected upwardly in a positive direction from zero to maximum deflection angles, there is shown in exploded views I″ and J″ the combined effects of radial and degrouping misregistration errors on the landing positions of beams R, B, and G. As may be seen by comparing FIGURES 2 and 3, for positive beam deflection angles the effect of radial misregistration on electron beam B is opposite from the effect of degrouping misregistration; therefore, assuming radial and degrouping errors to be of equal magnitude, electron beam B remains in perfect register with phosphor dot *b* for all positive beam deflection angles. However, for negative beam deflection angles, radial and degrouping misregistration errors with respect to beam B are in the same direction and consequently additive as shown in views K″ and L″. Similarly, it follows that for positive deflection angles, electron beams R and G shift upwardly, as viewed in views I″ and J″, due to radial misregistration errors and then diverge outwardly due to degrouping misregistration errors. However, for negative deflection angles, electron beams R and G shift downwardly, as viewed in views K″ and L″, due to radial misregistration errors while diverging outwardly due to degrouping misregistration errors.

Figure 5:
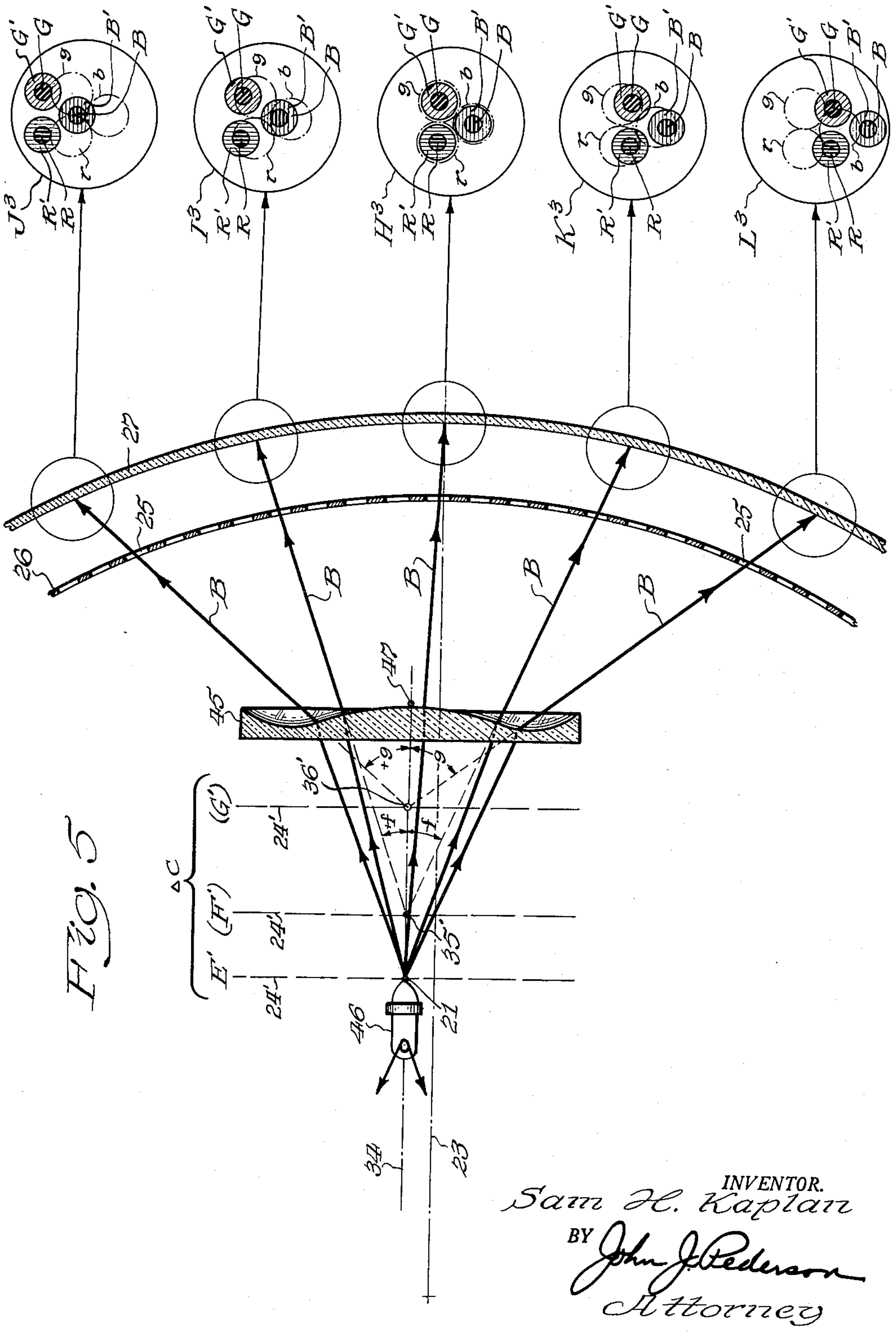
FIGURE 5 is a diagrammatic representation, partly in section, depicting the geometry of exposure light rays subjected to a correcting refractive optical field.

Due to the symmetrical relationship of misregistration errors for positive and negative beam deflection angles, as previously mentioned, it is known that radial misregistration errors can be eliminated by subjecting the exposure light rays, utilized in the photographic exposure screen fabrication process, to a refractive optical field which is fully symmetrical about the optical axis for each color-center during exposure of the photo-resist on the screen. FIGURE 5 is illustrative of such a process in which a well-known type of aspheric refractive corrector lens element 45 is interposed intermediate screen 27 and a source of light 46, preferably capable of generating light rays in the actinic range. However, it is equally well-known that the refractive lens need not be aspheric since any type of properly designed lens, in fact even a plane parallel glass plate, can give corrections which are satisfactory. Light source 46 is located coincident with optical axis 34 and generates an essentially cone-shaped bundle of light rays symmetrical about axis 34 and originating from a point which corresponds to one of the color-centers such as 21. Lens 45 is disposed with its geometric or optical center coincident with optical axis 34 and its plane substantially perpendicular thereto. Thus, by virtue of the refractive index, thickness, and curvature of lens 45, and the resulting well known spherical aberration phenomenon, the desired forward movement of the virtual plane-of-deflection is provided. By the correct choice of lens parameters, the light rays having positive emergence angles of $\pm f$ and $\pm g$ and negative emergence angles of $\mp f$ and $\mp g$, appear to have originated at points 35′ and 36′, respectively which correspond to points 35″ and 36 of FIGURE 2. Thus, it can now be seen that the virtual plane-of-deflection, as created by lens 45 and shown at 24′, corresponds with the actual plane-of-deflection 24 of FIGURE 2 and effectively shifts from position E′ through F′ to position G′ which correspond to position E, F, and G of FIGURE 2. With reference to views $H^3$ through $L^3$ of FIGURE 5, it is seen that the relative positions of the exposure light beam triads composed of beams R′, B′, and G′, with respect to phosphor dots *r*, *b*, and *g*, are coincident with and correspond to the relative positions of the electron beam triads, composed of beams R, B, and G, as shown in FIGURE 2. For clarity the effect of dynamic convergence degrouping is not shown in FIGURE 5.

Thus, the light rays from source 46 approach screen 27 at exactly the same angle as do the electron beams during actual operation of the cathode-ray tube. Consequently, by such photographic screen fabrication process, phosphor dot triads are deposited on screen 27 at exactly those points where the electron beams strike, leading to perfect compensation for dynamic shifting of the center of deflection during scanning.

However, even though there has been provided adequate compensation for radial misregistration, color tubes heretofore produced have all exhibited undesirable degrouping misregistration. As heretofore mentioned, the only approach to the problem of degrouping misregistration suggested to date is to apply static convergence correction so that the electron beams converge in the plane of the shadow mask only at those points midway between zero and maximum deflection angles; even with this compromise the degrouping misregistration error, though reduced by a factor of approximately 2, is still objectionable, leading to color contamination in the reproduced image.

Figure 6:
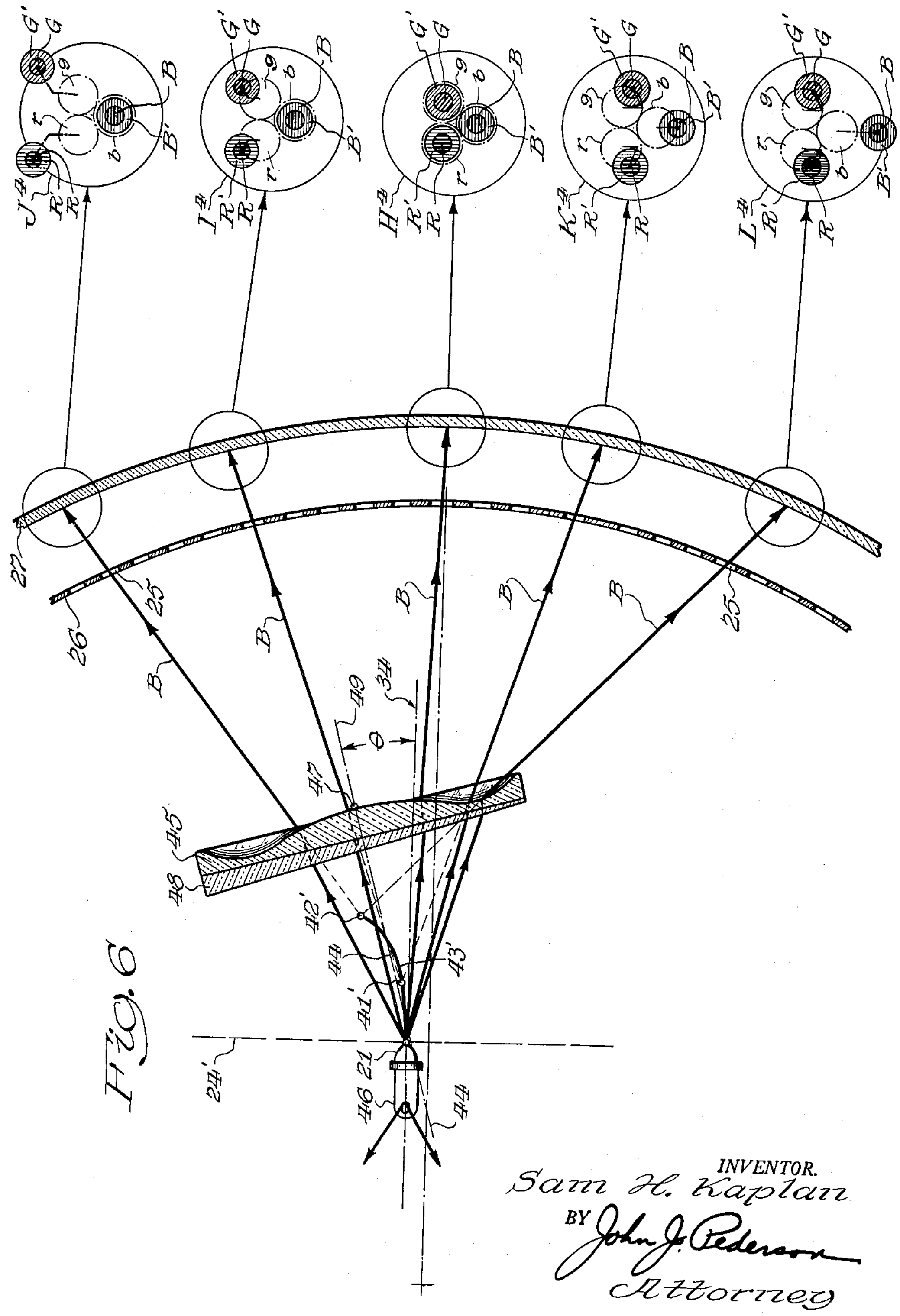
FIGURE 6 is a diagrammatic representation, partly in section, depicting the exposure geometry utilizing a selectively distorted refractive optical correcting field in accordance with one embodiment of the present invention.

FIGURE 6 schematically illustrates one embodiment of the process of the present invention in which the aspheric optical refractive element, such as the previously mentioned correcting lens 45, is provided with an additional optical refractive element of triangular cross-section, such as a prism 48 preferably, but not necessarily, in planar contact with the surface of lens 45 nearest light source 46. It has been discovered that when a refractive optical element composed of lens 45 and prism 48, which may be of unitary construction if desired, is positioned with geometric center 47 of lens 45 coincident with, and the common plane of lens 45 and prism 48 substantially perpendicular to, an inclined axis 49 which is coincident with line 44 (see FIGURE 4) and intersects optical axis 34 at color center 21, axis 49 being thus canted with respect to optical axis 34 by a positive angle $\theta$ whose tangent is in the same order of magnitude as but does not exceed $$\frac{\Delta A}{\Delta C}$$

the resultant refractive optical field has the property of providing an increasing index of refraction for light rays of positive emergence angles and a decreasing index of refraction for light rays of negative emergence angles, and this field can be adjusted to compensate for degrouping misregistration. Seen from another viewpoint, the spherical aberration effect moves along lens axis 49 as a function of the magnitude of the angle of emergence of the light rays and is essentially coincident with the color center locus line 21—42′. In this embodiment it was found that the addition of prism 48 was necessary to compensate for a constant error produced in the resultant optical field by the shifting of point 47 away from optical axis 34.

Therefore, light rays B′ of essentially zero emergence angles, as seen by the center of screen 27 (view $H^4$), appear to have originated at color center 21 while light rays of intermediate positive and negative emergence angles appear to have originated at point 41′ and the light rays of maximum positive and negative emergence angles appear to have originated essentially at point 42′ on curve 43′; these points and curve 43′ correspond respectively to points 21, 41, and 42 and curve 43 as previously described in relation to FIGURE 4 of the drawings. As curve 43′ of FIGURE 6 exactly coincides with and corresponds to curve 43 of FIGURE 4, by a comparison of views H″ through L″ and $H^4$ through $L^4$ of FIGURES 4 and 6 it is seen that the light beams R′, B′, and G′ strike screen 27 at exactly those points so as to be in perfect register with electron beams R, B, and G, respectively. It is now quite evident that if phosphor dots *r*, *b*, and *g* are deposited on screen 27 at those points corresponding to the position of light beams R′, B′, and G′, by the described and well-known photographic screen fabrication process, the electron beams will be in substantially perfect register with their respective phosphor dots over the complete area of fluorescent screen 27 because the pattern of each set of phosphor dots have been selectively distorted in this manner to simultaneously compensate for both radial and degrouping misregistration errors.

In FIGURE 7 there is illustrated a preferred embodiment of the present invention in which the necessity of prism 48 is alleviated. In this embodiment, lens 45 is symmetrically centered about an axis 50 which is inclined or tilted with respect to optical axis 34 by the same positive angle $\theta$ and, in addition, is displaced downwardly so that the optical center 47 is located at the intersection of axes 34 and 50. Thus, the constant correction error is no longer present and the necessity of additional prism compensation is eliminated. The optical field thus produced is again symmetrically disposed about tilted axis 50, but asymmetrically disposed with respect to optical axis 34. Thus, the optical field produced again has the property of providing an increasing refraction for light rays of positive emergence angles and a decreasing refraction for light rays of negative emergence angles, as previously shown in FIGURE 6. The actual angle of inclination required for complete degrouping error compensation depends upon the shape of the empirically determined aberration curve 43 of FIGURE 4 which may vary from one type of tube design to another. Normally, the slope of curve 43 increases gradually with relatively small beam deflection angles but increases very rapidly for relatively large beam deflection angles. Thus the slope of line 44 and consequently the angle of tilt of the lens will be somewhat less than $$\arctan \frac{\Delta A}{\Delta C}$$

to give full correction. For tubes having a maximum deflection angle of 70°, $$\arctan \frac{\Delta A}{\Delta C}$$

has empirically been determined to be approximately 14°, however a tilt of 8° has been found satisfactory for one type lens. As the enlarged views $H^5$–$L^5$ of FIGURE 7 are identical with the corresponding views $H^4$–$L^4$ of FIGURE 6, it is apparent that there has been provided a simple, yet highly effective fluorescent screen fabrication process which simultaneously and completely compensates for both radial and degrouping misregistration errors without the necessity of any additional processing apparatus.

It is recognized that among the most highly desirable characteristics of an ideal fluorescent screen for a color-image reproducer is that of a tangency relationship between the fluorescent sub-elemental areas for maximum uniform light intensity and for color reproducibility and fidelity. Such a characteristic may be preserved in the screen fabrication process of the invention by proper adjustment of the mask-screen design parameters, as by increasing the radius of curvature of the shadow mask. Because the invention provides complete compensation for both radial and degrouping misregistration, the process makes it feasible to increase the aperture dimensions in the color-selection electrode without adversely affecting color purity.

With reference to FIGURES 8–10 of the drawings, there are shown cross-sectional views of a correcting lens 51 having a plano-concave surface curvature, a plane parallel plate lens 52, and a lens 53 of zero curvature ($r_1=r_2$), all of which are capable of being utilized as the refractive optical field producing means in performing the process of the present invention; the essential criterion is that the spherical aberration move the apparent or virtual light source toward the screen with increasing scan angle. These refractive elements can be used directly "except" that the actual light source position has to be moved back by a definite amount to compensate for the difference between the position of the actual light source and the paraxial virtual image of the light source for these refractive elements. In these cases the virtual and actual sources are differently located and the virtual source must be at the color centers.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. In the art of manufacturing a cathode-ray tube of the type which requires dynamic convergence correction and contains a color-selection electrode having a multiplicity of systematically arranged apertures through which a plurality of electron-beam components pass along different angularly related paths, in transit from respective color-centers located at respective predetermined points which are radially spaced from the longitudinal axis of said tube and disposed in a plane-of-deflection substantially perpendicular to said tube axis, to impinge upon respective sub-elemental areas of respectively different color-response characteristics on the mosaic surface of a nearby fluorescent screen, the process of producing a fluorescent screen comprising such sub-elemental areas arranged on a support in a selectively distorted pattern to compensate for an effective shift of position of said plane-of-deflection along said axis, said shift varying in amount with deflection of said electron-beam components and being of a maximum amount $\Delta C$, and additionally to compensate simultaneously for an effective change of position of said color centers in a direction radially of said axis, said change varying in amount with said dynamic convergence and being of a maximum amount $\Delta A$, whereby said electron-beam components centrally impinge upon their respective sub-elemental areas over substantially the entire area of said fluorescent screen, said process comprising: providing said support with a coating of material sensitive to light energy; projecting light energy from a selected point corresponding to one of said predetermined points along a reference axis extending toward said color-selection electrode; and passing said projected light energy through a refractive lens at a location with its effective optical center on said reference axis and of a configuration compensating for said plane-of-deflection effective position shift and canted about said effective optical center in a positive direction with respect to said reference axis by an angle whose tangent is approximately $$\frac{\Delta A}{\Delta C}$$

to compensate for said color center effective position change and re-direct said light energy along corrected paths through the apertures of said color-selection electrode to expose selective areas of said coating to said light energy.

2. In the art of manufacturing a cathode-ray tube of the type which requires dynamic convergence correction and contains a color-selection electrode having a multiplicity of systematically arranged apertures through which a plurality of electron-beam components pass along different angularly related paths, in transit from respective color-centers located at respective predetermined points which are radially spaced from the longitudinal axis of said tube and disposed in a plane-of-deflection substantially perpendicular to said tube axes, to impinge upon respective sub-elemental areas of respectively different color-response characteristics on the mosaic surface of a nearby fluorescent screen the process of producing a fluorescent screen comprising such sub-elemental areas arranged on a support in a selectively distorted pattern to compensate for an effective shift of position of said plane-of-deflection along said axis, said shift varying in amount with deflection of said electron-beam components and being of a maximum amount ΔC, and additionally to compensate simultaneously for an effective change of position of said color centers in a direction radially of said axis, said change varying in amount with said dynamic convergence and being of a maximum amount ΔA, whereby said electron-beam components centrally impinge upon their respective sub-elemental areas over substantially the entire area of said fluorescent screen, said process comprising: providing said support with a coating of material sensitive to light energy; projecting light energy toward said color-selection electrode from a selected point corresponding to one of said predetermined points along a reference axis substantially parallel to said longitudinal axis; and passing said projected light energy through a refractive lens at a location with its effective optical center on said reference axis and of a configuration compensating for said plane-of-deflection effective position shift and canted about said effective optical center in a positive direction with respect to said reference axis by an angle whose tangent is approximately $$\frac{\Delta A}{\Delta C}$$

to compensate for said color center effective position change and re-direct said light energy along corrected paths through the apertures of said color-selection electrode to expose selective areas of said coating to said light energy.

3. In the art of manufacturing a cathode-ray tube of the type which requires dynamic convergence correction and contains a color-selection electrode having a multiplicity of systematically arranged apertures through which a plurality of electron-beam components pass along different angularly related paths, in transit from respective color-centers located at respective predetermined points which are radially spaced from the longitudinal axis of said tube and disposed in a plane-of-deflection substantially perpendicular to said tube axis, to impinge upon respective sub-elemental areas of respectively different color-response characteristics on the mosaic surface of a nearby fluorescent screen, the process of producing a fluorescent screen comprising such sub-elemental areas arranged on a support in a selectively distorted pattern to compensate for an effective shift of position of said plane-of-deflection along said axis, said shift varying in amount with deflection of said electron-beam components and being of a maximum amount ΔC, and additionally to compensate simultaneously for an effective change of position of said color centers in a direction radially of said axis, said change varying in amount with said dynamic convergence and being of a maximum amount ΔA, whereby said electron-beam components centrally impinge upon their respective sub-elemental areas over substantially the entire area of said fluorescent screen, said process comprising: providing said support with a coating of material sensitive to light energy; projecting light energy from a selected point corresponding to one of said predetermined points along a reference axis extending toward said color-selection electrode; and passing said projected light energy through a refractive lens at a location having its optical axis intersecting said point with its effective optical center on said reference axis and of a configuration compensating for said plane-of-deflection effective position shift and canted about said effective optical center in a positive direction with respect to said reference axis by an angle whose tangent is approximately $$\frac{\Delta A}{\Delta C}$$

to compensate for said color center effective position change and re-direct said light energy along corrected paths through the apertures of said color-selection electrode to expose selective areas of said coating to said light energy.

4. In the art of manufacturing a cathode-ray tube of the type which requires dynamic convergence correction and contains a color-selection electrode having a multiplicity of systematically arranged apertures through which a plurality of electron-beam components pass along different angularly related paths, in transit from respective color-centers located at respective predetermined points which are radially spaced from the longitudinal axis of said tube and disposed in a plane-of-deflection substantially perpendicular to said tube axis, to impinge upon respective sub-elemental areas of respectively different color-response characteristics on the mosaic surface of a nearby fluorescent screen, the process of producing a fluorescent screen comprising such sub-elemental areas arranged on a support in a selectively distorted pattern to compensate for an effective shift of position of said plane-of-deflection along said axis, said shift varying in amount with deflection of said electron-beam components and being of a maximum amount ΔC, and additionally to compensate simultaneously for an effective change of position of said color centers in a direction radially of said axis, said change varying in amount with said dynamic convergence and being of a maximum amount ΔA, whereby said electron-beam components centrally impinge upon their respective sub-elemental areas over substantially the entire area of said fluorescent screen, said process comprising: providing said support with a coating of material sensitive to light energy; projecting light energy from a selected point corresponding to one of said predetermined points along a reference axis extending toward said color-selection electrode; and passing said projected light energy through a refractive lens at a location with its optical axis intersecting said reference axis at its optical center and of a configuration compensating for said plane-of-deflection effective position shift and canted about said optical center in a positive direction with respect to said reference axis by an angle whose tangent is approximately $$\frac{\Delta A}{\Delta C}$$

to compensate for said color center effective position change and re-direct said light energy along corrected paths through the apertures of said color-selection electrode to expose selective areas of said coating to said light energy.

5. In the art of manufacturing a cathode-ray tube of the type which requires dynamic convergence correction and contains a color-selection electrode having a multiplicity of systematically arranged apertures through which a plurality of electron-beam components pass along different angularly related paths, in transit from respective color-centers located at respective predetermined points which are radially spaced from the longitudinal axis of said tube and disposed in a plane-of-deflection substantially perpendicular to said tube axis, to impinge upon respective sub-elemental areas of respective different color-response characteristics on the mosaic surface of a nearby fluorescent screen, the process of producing a fluorescent screen comprising such sub-elemental areas arranged on a support in a selectively distorted pattern to compensate for an effective shift of position of said plane-of-deflection along said axis, said shift varying in amount with deflection of said electron-beam components and being of a maximum amount ΔC, and additionally to compensate simultaneously for an effective change of position of said color centers in a direction radially of said axis, said change varying in amount with said dynamic convergence and being of a maximum amount ΔA, whereby said electron-beam components centrally impinge upon their respective sub-elemental areas over substantially the entire area of said fluorescent screen, said process comprising: providing said support with a coating of material sensitive to light energy; projecting light energy from a selected point corresponding to one of said predetermined points along and radially symmetrical with respect to a reference axis extending toward said color-selection electrode; and passing said projected light energy through a refractive lens at a location with its effective optical center on said reference axis and of a configuration compensating for said plane-of-deflection effective position shift and canted about said effective optical center in a positive direction with respect to said reference axis by an angle whose tangent is approximately $$\frac{\Delta A}{\Delta C}$$

to compensate for said color center effective position change and re-direct said light energy along corrected paths through the apertures of said color-selection electrode to expose selective areas of said coating to said light energy.

6. In the art of manufacturing a cathode-ray tube of the type which requires dynamic convergence correction and contains a color-selection electrode having a multiplicity of systematically arranged apertures through which a plurality of electron-beam components pass along different angularly related paths, in transit from respective color-centers located at respective predetermined points which are radially spaced from the longitudinal axis of said tube and disposed in a plane-of-deflection substantially perpendicular to said tube axis, to impinge upon respective sub-elemental areas of respectively different color-response characteristics on the mosaic surface of a nearby fluorescent screen, the process of producing a fluorescent screen comprising such sub-elemental areas arranged on a support in a selectively distorted pattern to compensate for an effective shift of position of said plane-of-deflection along said axis, said shift varying in amount with deflection of said electron-beam components and being of a maximum amount ΔC, and additionally to compensate simultaneously for an effective change of position of said color centers in a direction radially of said axis, said change varying in amount with said dynamic convergence and being of a maximum amount ΔA, whereby said electron-beam components centrally impinge upon their respective sub-elemental areas over substantially the entire area of said fluorescent screen, said process comprising: providing said support with a coating of material sensitive to light energy; projecting light energy from a selected point corresponding to one of said predetermined points along a reference axis extending toward said color-selection electrode; and passing said projected light energy through a refractive lens radially symmetrical about its optical axis and at a location with its effective optical center on said reference axis and of a configuration compensating for said plane-of-deflection effective position shift and canted about said effective optical center in a positive direction with respect to said reference axis by an angle whose tangent is approximately $$\frac{\Delta A}{\Delta C}$$

to compensate for said color center effective position change and re-direct said light energy along corrected paths through the apertures of said color-selection electrode to expose selective areas of said coating to said light energy.

References Cited in the file of this patent

UNITED STATES PATENTS

| | | |
|---|---|---|
| 2,733,366 | Grimm et al. | Jan. 31, 1956 |
| 2,817,276 | Epstein et al. | Dec. 24, 1957 |
| 2,936,682 | Kravitz | May 17, 1960 |
| 2,936,683 | Burdick et al. | May 17, 1960 |

OTHER REFERENCES

RCA Review, vol. XVII, No. 2, June 1956, pp. 155–164.

Levy et al.: Sylvania Technologist, July 1953, pp. 60–63.